Feb. 23, 1943.    G. ROETHEL, JR    2,311,902
ANTI-BACKLASH DIAL
Filed Nov. 6, 1940
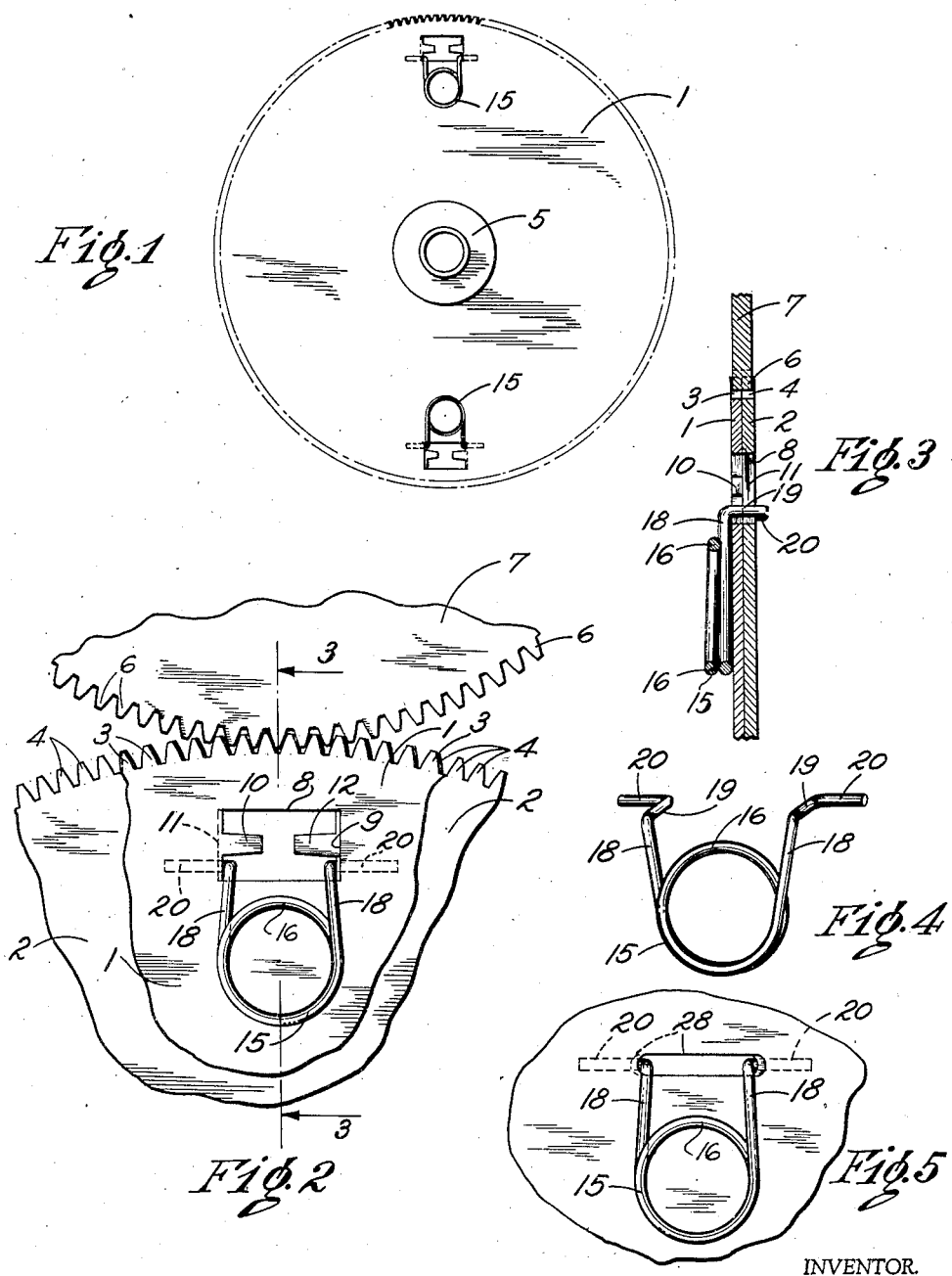
INVENTOR.
GEORGE ROETHEL, JR.
BY
Richey Watts
ATTORNEYS Patented Feb. 23, 1943

2,311,902

UNITED STATES PATENT OFFICE 2,311,902

ANTIBACKLASH DIAL

George Roethel, Jr., Chicago, Ill., assignor to E. H. Scott

Application November 6, 1940, Serial No. 364,549

3 Claims. (Cl. 74—440)

This invention relates to improvements in gears, and more particularly to an improved anti-back-lash gear.

Gears for removing the play due to lost motion between the teeth are relatively well known. One such type of gear comprises a pair of plates held in juxtaposed position and having matching teeth on their peripheries. These plates are secured to a hub and are capable of movement on the hub relative to each other to cause displacement of the teeth thus widening or narrowing the teeth of the composite gear to take up any space in the gear train due to tolerances, wear, or the like. It has been proposed to cause this relative movement by using a spring to move the composite gear parts in opposite directions. Heretofore this spring tension has been achieved by providing a pair of rectangular openings in the plates of the composite gear, which openings are offset relative to each other when the teeth in the two plates are aligned. Each opening in each gear is provided with one tongue which extends toward the center of the opening, and a helical spring is disposed over these tongues on the opposite plates during assembly. The spring causes the two plates to rotate in opposite directions until the two openings are aligned, at which time the teeth of the gears have been displaced relative to each other to cause the teeth of the composite gear to take up a larger space.

These prior springs had to be inserted in the openings provided in the gears during assembly of the gears before the two plates were secured to the hub. Thus after the gears were assembled and before they were placed in the mechanism for which they were intended, a displacement of the teeth was realized which made it difficult to cause the teeth to mesh with the other gear.

By the present invention the gear may be assembled without the springs and the parts secured to the hub in the usual manner after which the gear without the spring is disposed in its desired train and then the springs placed in position after the gear train is assembled.

It is therefore an object of this invention to provide an anti-back-lash gear which is easier to assemble and one in which the displacing means for the sections of the gear may be inserted or removed without dis-assembling the gear.

Still another object of the invention results in a simplified construction which permits a more simplified gear resulting in economies in die costs, construction and provided for longer wearing dies.

Still other objects of the invention and the invention itself will become more apparent from the following description of an embodiment thereof, which description is illustrated by the accompanying drawing.

In the drawing:

Fig. 1 is a side elevational view of a composite gear showing the improved spring tensioning means of my invention in place therein, certain hidden parts being shown by dotted lines;

Fig. 2 is an enlarged fragmentary view of a train of gears and showing an enlarged view of the improved spring and cooperating gear parts;

Fig. 3 is a section taken on the line 3—3 of Fig. 2;

Fig. 4 is a perspective view of the spring; and

Fig. 5 is a view showing a modified and simplified form of slot openings which may be used in the composite gear.

Referring to the drawing, like parts have been designated throughout by like reference characters. As illustrated in the drawing the composite gear of my invention comprises a pair of plates 1 and 2 having teeth 3 and 4 respectively, which plates are secured to a hub 5 in a well known manner. The teeth 3 and 4 on the two parts are matched and adapted to mesh with the teeth 6 of another gear 7 of the gear train. As previously mentioned, the lost motion between the two pairs of gears is taken up by causing the section 1 to rotate in one direction, and the section 2 to rotate in the other direction. This is accomplished by spring means. Heretofore the gear 1 was provided with a rectangular opening 8 having one end thereof plain, as indicated at 9, and the other end provided with a tongue, as indicated at 10, extending toward the center part of the opening. The other plate 2 was provided with a similar opening 8 having the end 11 plain and the opposite end provided with a tongue 12 extending toward the tongue 10. These two openings in the two plates are so arranged that they are offset slightly relative to each other, as indicated in the drawing, Fig. 2, when the teeth of the two gear parts 1 and 2 are in alignment. Previously a helical spring was disposed over the tongues 10 and 12 which causes the two gears to rotate until the two openings were in alignment, or until the space or lost motion between the teeth of the train of gears was eliminated. The tongues 10 and 12 had to extend relatively close to each other and be relatively long in order to furnish lateral support for the spring which had a tendency to bend out of position if they were not properly supported. The spring had to also be relatively stiff in order to furnish the desired tension. Because of these requirements it was necessary to place the spring over the two tongues before or during the process of assembling the gears in their juxtaposed position on the hub. In a gear such as shown in Fig. 1 it was necessary to perform the relatively difficult operation of placing two springs in position simultaneously and holding them in position and spinning the hub in place in the central hole of the gear, since the length and strength of the spring would not permit the spring to be placed in position after the gear was assembled. The previous gears when thus assembled had the openings 8 in alignment and their teeth 3 and 4 in the greatest position of mis-alignment. It was therefore necessary to apply some kind of an instrument to the teeth of the gears to align them and put the spring under compression when the third gear 7 was meshed therewith. This was not only difficult, but sometimes resulted in knocking up burrs on the teeth or even bending the teeth in the case of brass gears to cause subsequent irregularities in the meshing resulting in noisy and uneven operation.

By the present invention I assemble the two halves of the composite gear on the hub and spin them in place without placing the spring in the openings 8. I then provide a spring which may be formed as shown in Fig. 4 comprising a central or bight portion 15 which may be provided with one or more loops 16 depending upon the amount of resiliency desired and the ends of which provide tangentially extending arms 18. The ends of the arms 18 are provided with offset portions 19 extending at approximately right angles from the arms and substantially parallel to each other. The ends of these portions 19 terminate in lateral and oppositely extending arms 20.

The gear having been assembled and placed in its proper position in the train, the spring may be secured in place by first inserting one of the arms 20 through the opening 8 below the tongue 12, after which the spring may be bent so that the other end 20 may be readily inserted below the tongue 10 on the opposite side of the opening 8. When the spring is released the two portions 19 engage the edges of the openings 8 and force the two gears in opposite directions, as best shown in Fig. 2. It will readily be seen that the spring may be quickly and easily removed with any simple instrument such as a pair of pliers.

Figs. 1 to 3 inclusive have illustrated the conventional type of opening in the gear. In Fig. 5 I have illustrated a simplified form of opening which may comprise a plain rectangular opening 28 of sufficient width to permit ready insertion of the arms 19—20 of the spring. A gear with such an opening is considerably less expensive to make and requires simpler dies which have a much longer life.

Having thus described my invention I am aware that numerous and extensive departures will be apparent to those versed in the art without departing from the spirit or scope of the invention.

I claim:

1. A device of the class described wherein a pair of juxtaposed plates each having aligned gear engaging teeth for engagement with another gear is provided having spring means for displacing said plates relative to each other to cause said teeth to take up the clearance space between said gears by engaging the plates and urging them in opposite directions, the combination therewith of a spring comprising a helix adapted to be disposed adjacent the face of the gear and having tangential arms extending therefrom and provided with lateral offset portions for engagement with the plates.

2. An anti-back-lash gear wherein a pair of plates are formed with openings therein and having matched teeth on the periphery, said openings bearing such a relation to the gear teeth that when the teeth are aligned the openings are mis-aligned, and spring means is provided for engagement with the plates at said mis-aligned openings for urging the openings toward aligned position to mis-align said teeth, the combination of a spring with said plates comprising a substantially U-shaped spring having offset arms extending through said openings and engaging the plates at the edges of the openings.

3. An anti-back-lash gear wherein there is provided a pair of juxtaposed plates having aligned gear teeth on their peripheries and formed with openings through the sides of the plates, said openings being offset slightly relative to each other when the teeth are aligned, and wherein spring means is provided for engaging the plates at the opposite edges of said openings for moving the plates relative to each other to align said openings and throw said teeth out of alignment, the combination with said plates of spring means comprising a helix adapted to be disposed along the side of the gear, tangential arms extending from said helix having the ends offset in the same direction to extend through said openings and disposed in engagement with the opposite edges of the plates in said openings and extending arms at the ends of said offset for engagement with the other side of said plate for retaining the spring in position.

GEORGE ROETHEL, Jr.